United States Patent [19]

Klassen

[11] Patent Number: 5,341,467

[45] Date of Patent: Aug. 23, 1994

[54] METHOD AND APPARATUS FOR GENERATING AND DISPLAYING FREEFORM STROKES OF VARYING OR CONSTANT WIDTH USING ADAPTIVE FORWARD DIFFERENCING

[75] Inventor: Robert V. Klassen, Webster, N.Y.

[73] Assignee: Xerox Corporation, Stamford, Conn.

[21] Appl. No.: 814,652

[22] Filed: Dec. 30, 1991

[51] Int. Cl.[5] ............................................. G06F 15/62
[52] U.S. Cl. ..................................... 395/142; 395/141
[58] Field of Search ............... 395/142, 141, 140, 161; 340/729, 734, 747; 345/14, 15, 16, 17

[56] References Cited

U.S. PATENT DOCUMENTS

| 4,620,287 | 10/1986 | Yam | 364/518 |
| 4,674,058 | 6/1987 | Lindbloom et al. | 364/518 |
| 4,855,935 | 8/1989 | Lien et al. | 364/521 |
| 4,912,659 | 3/1990 | Liang | 364/521 |
| 4,933,889 | 6/1990 | Meshkat et al. | 364/578 |
| 4,943,935 | 7/1990 | Sato | 364/518 |

OTHER PUBLICATIONS

Chua, Y. S., "Bezier Brushstrokes," *Computer-Aided Design,* vol. 22, No. 9, Nov. 1990, pp. 550-556.
Pham, B., "Expressive Brush Strokes," *CVGIP: Graphical Models and Image Processing,* vol. 53, No. 1, Jan. 1991, pp. 1-6.
S-L Lien et al., "Adaptive Forward Differencing for Rendering Curves and Surfaces," *Computer Graphics,* vol. 21, No. 4, Jul. 1987.
R. Klassen, "Integer Forward Differencing of Cubic Polynomials: Analysis and Algorithms," *AMC Transactions on Graphics,* vol. 10, No. 2, Jul. 1987, pp. 152-181.

*Primary Examiner*—Phu K. Nguyen
*Attorney, Agent, or Firm*—Finnegan, Henderson, Farabow, Garrett & Dunner

[57] ABSTRACT

Method and apparatus for generating and displaying a freeform stroke of varying or constant width by generating points along a centerline curve and right and left offset curves of the freeform stroke using an adaptive forward differencing technique.

12 Claims, 5 Drawing Sheets

METHOD AND APPARATUS FOR GENERATING AND DISPLAYING FREEFORM STROKES OF VARYING OR CONSTANT WIDTH USING ADAPTIVE FORWARD DIFFERENCING

BACKGROUND OF THE INVENTION

Field of the Invention

The present invention relates to a method and apparatus for generating and displaying freeform strokes of varying or constant width and, more specifically, to a method and apparatus for generating and displaying points along a centerline curve and right and left offset curves of a freeform stroke of varying or constant width using an adaptive forward differencing technique.

Description of the Related Art

Freeform curves, which have no width, have useful applications in, for example, computer aided design and manufacturing systems, computer graphics, graphic arts, and typesetting for creating curved surfaces (see, e.g., U.S. Pat. No. 4,943,935 issued to Sato, which discloses a method and apparatus for expressing curved surfaces using curves of an nth order such as Bezier cubic curves). Freeform strokes, which have widths, also have useful applications in, for example, computer aided design and manufacturing systems, computer graphics, graphic arts, and typesetting for creating both uniform and variable width shapes and figures (see, e.g., U.S. Pat. No. 4,674,058 issued to Lindbloom et al., which discloses a method and apparatus for representing and recreating two dimensional arbitrary shapes using Bezier curves).

In particular, U.S. Pat. No. 4,855,935 issued to Lien et al., and S-L Lien, M. Shantz, and V. Pratt, *Adaptive Forward Differencing for Rendering Curves and Curved Surfaces*, Computer Graphics Vol. 21 No. 4 (July 1987) disclose an adaptive forward differencing technique for rendering curves and curved surfaces on display device, such as a CRT, by actuating display elements defining the curve. A plurality of data points representative of display elements are used to render the curve in substantially form single pixel steps using the adaptive forward differencing technique.

SUMMARY OF THE INVENTION

Accordingly, it is an object of the present invention to provide a method and apparatus for generating and displaying a freeform stroke of varying or constant width.

Another object of the present invention is to provide a method and apparatus for generating and displaying points along a centerline curve and right and left offset curves of a freeform stroke of varying or constant width using an adaptive forward differencing technique.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a method of generating and displaying a freeform stroke of varying or constant width is provided, comprising the steps of generating, using an adaptive forward differencing technique in accordance with a step size of a parameter t, points along a centerline curve of the freeform stroke, the centerline curve being a spline curve varying as a function of the parameter t, and each of the points along the centerline curve being associated with a horizontal coordinate defined by a function x(t), a vertical coordinate defined by a function y(t), and a width defined by a function w(t); generating a normal vector associated with each of the points along the centerline curve; generating points along a right offset curve and a left offset curve for corresponding ones of the points along the centerline curve, each of the points along the right and left offset curves being associated with a horizontal coordinate and a vertical coordinate generated in accordance with the horizontal coordinate, vertical coordinate, width, and normal vector associated with a corresponding point along the centerline curve; and displaying graphical representations of the points along the right and left offset curves to display an outer boundary of the freeform stroke.

Also in accordance with the purposes of the invention as embodied and broadly described herein, an apparatus for generating and displaying a freeform stroke of varying or constant width is provided, comprising a circuit for generating, using an adaptive forward differencing technique in accordance with a step size of a parameter t, points along a centerline curve of the freeform stroke, the centerline curve being a spline curve varying as a function of the parameter t, and each of the points along the centerline curve being associated with a horizontal coordinate defined by a function x(t), a vertical coordinate defined by a function y(t), and a width defined by a function w(t); a circuit for generating a normal vector associated with each of the points along the centerline curve; a circuit for generating points along a right offset curve and a left offset curve for corresponding ones of the points along the centerline curve, each of the points along the right and left offset curves being associated with a horizontal coordinate and a vertical coordinate generated in accordance with the horizontal coordinate, vertical coordinate, width, and normal vector associated with a corresponding point along the centerline curve; and a circuit for displaying graphical representations of the points along the right and left offset curves to display an outer boundary of the freeform stroke.

BRIEF DESCRIPTION OF THE DRAWINGS

The accompanying drawings, which are incorporated in and constitute a part of the specification, illustrate a presently preferred embodiments of the invention and, together with the general description given above and the detailed description of the preferred embodiments given below, serve to explain the principles of the invention. In the drawings.

DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

In the present invention, a freeform stroke is defined by a centerline curve and a right and left offset curve. The right and left offset curves are each a distance w from the centerline curve, the distance w being defined along a normal to each point along the centerline curve. In the absence of a sign convention for the normal, an offset curve is defined on both sides of the centerline curve. Generally, the term "left offset curve" designates the offset curve based upon a normal given by a positive sign, while the term "right offset curve" designates the offset curve based upon a normal by the negative sign. Further, the term "offset curve" is used to refer to one or the other of the left and right offset curves, while the term "offset curve pair" indicates both the left and right offset curves. Still further, the term "offset point" is used to refer to a point along an offset curve. As a preliminary note, it should be understood that the centerline curve of the freeform stroke is a spline curve, i.e., a curve whose shape can be defined by a series of control points, as is known to those of ordinary skill in the art. Examples of spline curves are Bezier curves and B-spline curves.

First Embodiment

Figure 1:
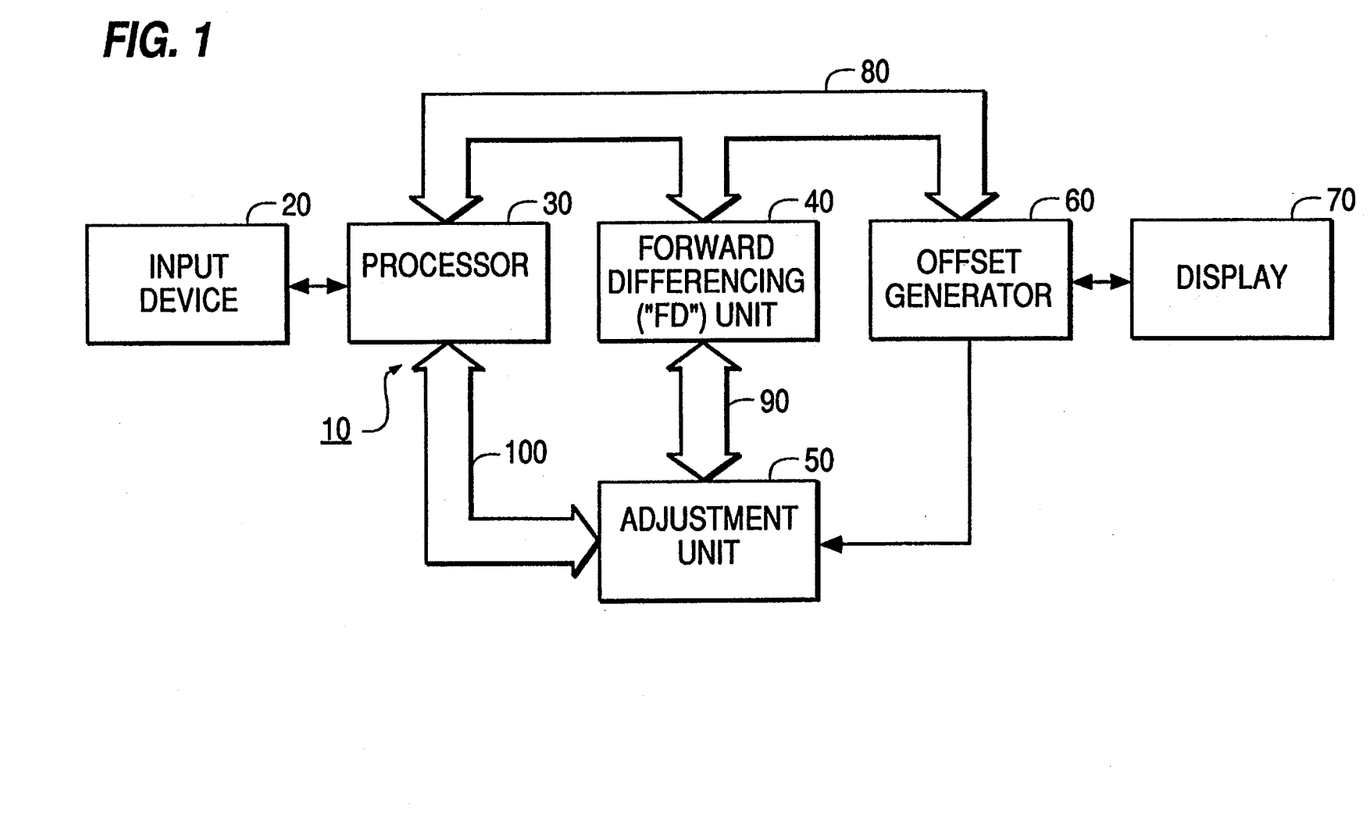
FIG. 1 is a block diagram illustrating a freeform stroke generation and display system in accordance with one embodiment of the present invention.

As shown in FIG. 1, there is provided a freeform stroke generation and display system 10 for generating and displaying a freeform stroke of constant or varying width in accordance with a first embodiment of the present invention. The system 10 comprises an input device 20, a processor 30, a forward differencing ("FD") unit 40, an adjustment unit 50, an offset generator 60, a display 70, and data/control busses 80, 90, and 100.

The input device 20 comprises, for example, any of a keyboard, mouse, touchscreen panel, and digitizer for enabling an operator of the system 10 to transmit to the processor 30 parameters associated with a plurality of control points which define a centerline curve of a freeform stroke to be generated and displayed.

The processor 30 comprises, for example, any standard CPU capable of initializing the FD unit 40 by determining forward differencing coefficients from the parameters transmitted by the input device 20, and capable of generating points along a right offset curve and a left offset curve for corresponding ones of the control points using the parameters associated with the control points and respective tangent vectors. For example, a Motorola 680x0, Intel/IBM R6000, or SPARC can be used as the processor 30. The processor 30 executes a software program stored in a memory (not shown) to perform the functions described below in connection with the processor 30.

The FD unit 40 comprises, for example, circuitry for generating, using a forward differencing technique in accordance with a step size of a parameter t, points along a centerline curve of the freeform stroke, wherein the centerline curve varies as a function of the parameter t, and wherein each point along the centerline curve is associated with a horizontal coordinate defined by a function $x(t)$, a vertical coordinate defined by a function $y(t)$, and a width defined by a function $w(t)$.

Figure 2:
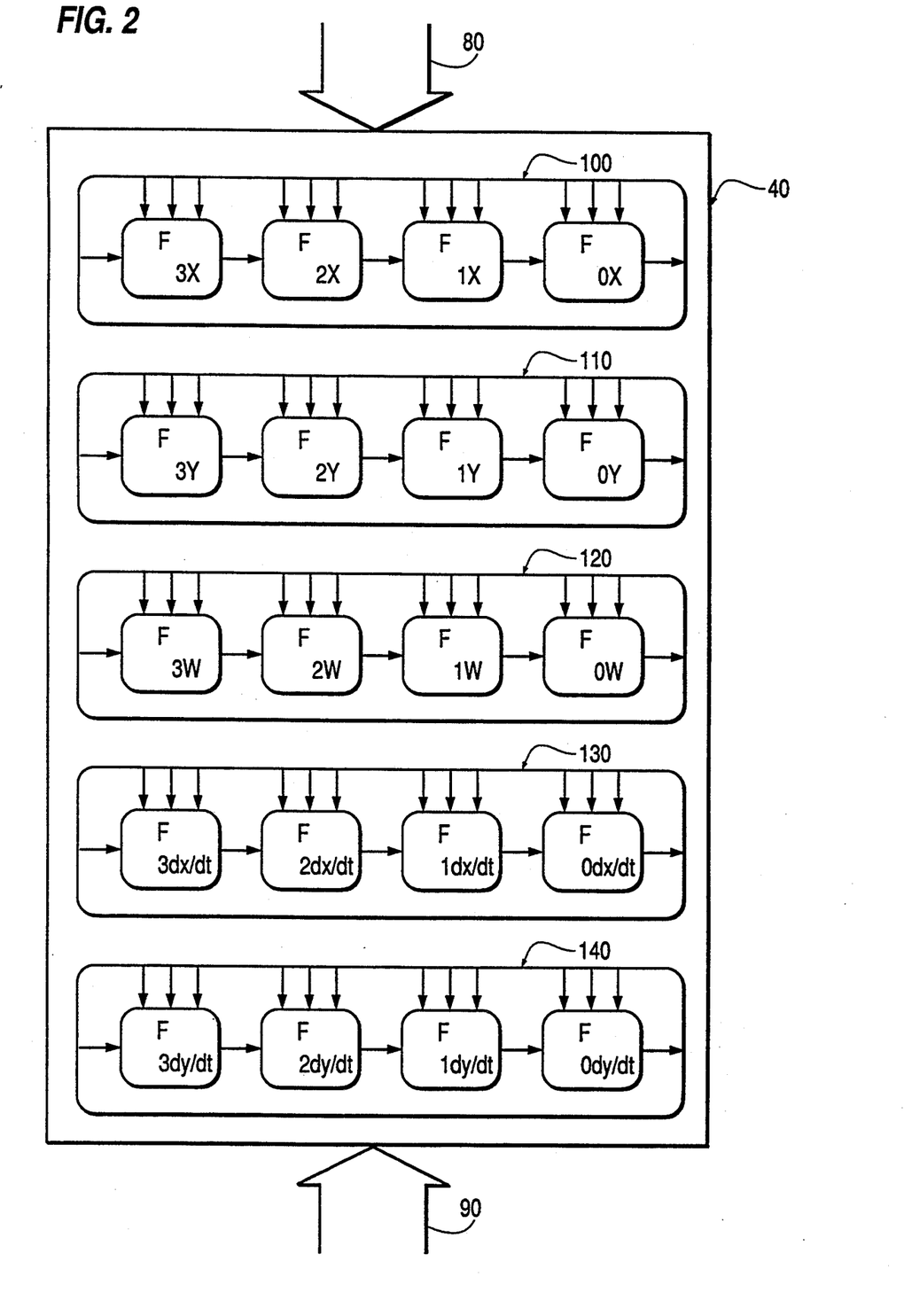
FIG. 2 is a block diagram illustrating a forward differencing unit of the freeform stroke generation and display system of FIG. 1.

As shown in FIG. 2, preferably, the FD unit 40 comprises FD circuits 100, 110, 120, 130, and 140 corresponding to the parameters x, y, w, dx/dt, and dy/dt, respectively. As also shown in FIG. 2, preferably, each FD circuit includes four forwarding circuits $F_0$ through $F_3$, each of which includes a data latch, an adder, and control logic (not shown).

Figure 3:
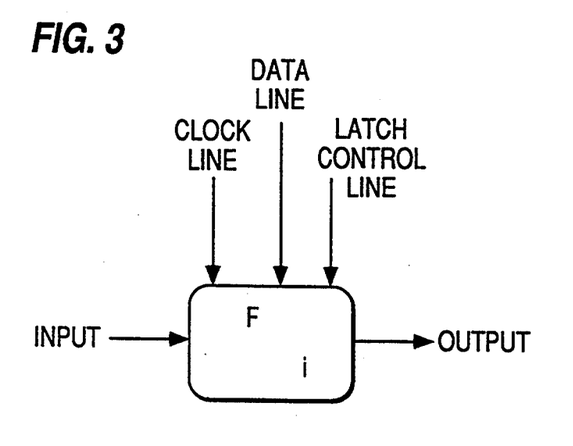
FIG. 3 is a block diagram illustrating a forwarding circuit of the forward differencing unit of FIG. 2.

As shown in FIG. 3, each forwarding circuit has an input line, an output line, a clock line, a latch control line, and a data line, all of which are connected to the data/control busses 80 and 90. It should be understood that, when the latch control line is high, data on the data line is loaded into the data latch on a next clock cycle. When the latch control line is low, data on the input line is added to the data stored in the data latch on the next clock cycle. Further, the output line, preferably, always transmits the data stored in the latch. It should also be understood that the input line of the leftmost forwarding circuit of each FD circuit of FIG. 2 is fed with the constant zero.

The adjustment unit 50 of FIG. 1 comprises, for example, circuitry for updating coefficients stored in the forwarding circuits of the FD unit 40 in accordance with instructions from the offset generator 60. Preferably, the adjustment unit 50 comprises a plurality of registers, each corresponding to one of the FD circuits 100, 110, 120, 130, and 140, for storing the differencing coefficients. The step adjustment circuit 50, preferably, also comprises control logic for updating the coefficients stored in its registers in accordance with a step size adjustment indicated by the offset generator 60, and for loading the updated coefficients, via the data/control bus 90, into corresponding ones of the forwarding circuits of the FD circuits 100, 110, 120, 130, and 140.

The offset generator 60 comprises, for example, circuitry for generating a unit normal vector associated with each point along the centerline curve generated by the FD unit 40, and for generating points along a right offset curve and a left offset curve for corresponding ones of the points along the centerline curve. Each of the points along the right and left offset curves is associated with a horizontal coordinate and a vertical coordinate generated in accordance with the horizontal coordinate, vertical coordinate, width, and unit normal vector associated with a corresponding point along the centerline curve. Preferably, the offset generator 60 also comprises, for example, circuitry for specifying a step size adjustment in accordance with the screen coordinates of adjacent right and left offset points.

The display 70 of FIG. 1 comprises, for example, a color or monochrome visual display capable of displaying graphical representations of points along the centerline curve and the right and left offset curves generated by the offset generator 60. Likewise, the display 70 can comprise a printing device such as a laser printer or plotter.

Figure 4:
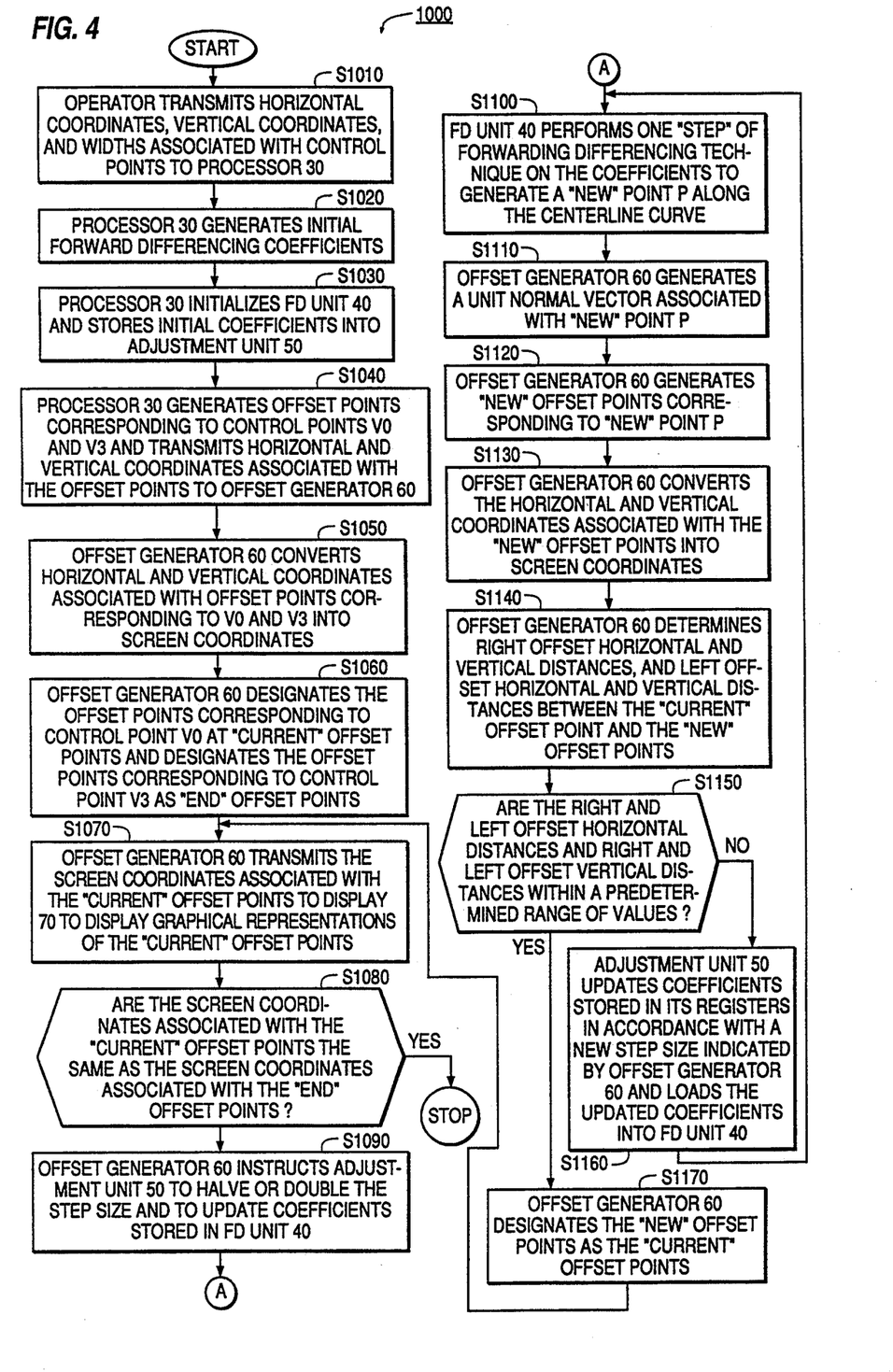
FIG. 4 is a flow diagram illustrating an operation of the freeform stroke generation and display system of FIG. 1.

An operation of the system 10 of FIG. 1 will now be described, in detail, with reference to the flow diagram 1000 of FIG. 4.

In step S1010, an operator transmits to the processor 30, via the input device 20, horizontal coordinates, vertical coordinates, and widths associated with a plurality of control points. As described above, the control points define the shape of a centerline curve of a freeform stroke which is to be generated and displayed. The parameters associated with each control point include a horizontal coordinate, a vertical coordinate, and a width.

Figure 5:
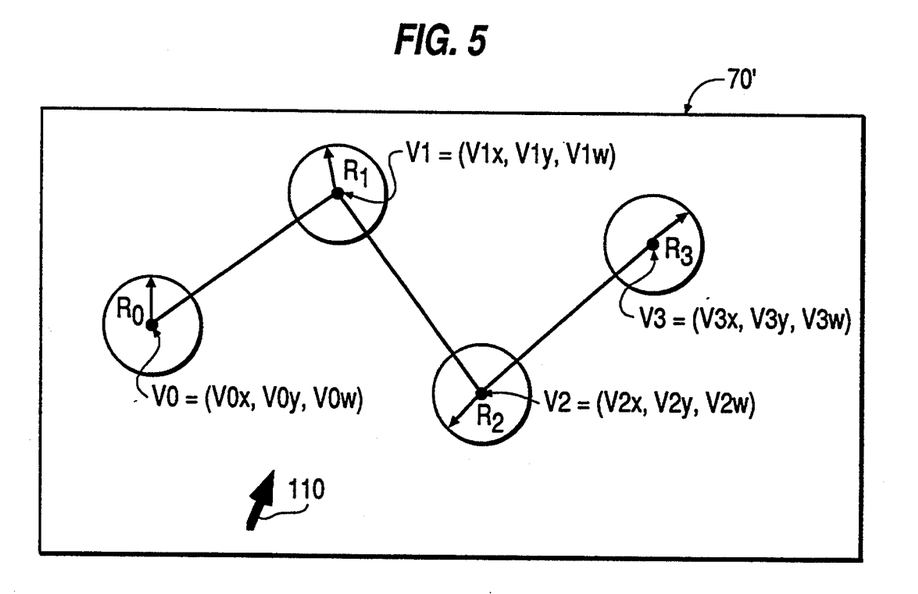
FIG. 5 illustrates a technique for transmitting horizontal coordinates, vertical coordinates, and widths associated with control points to a processor of the freeform stroke generation and display system of FIG. 1.

For the sake of simplicity, it will be assumed that the operator inputs horizontal and vertical coordinates and widths associated with only four control points. For example, as shown in FIG. 5, in step S1010, the operator inputs horizontal coordinates $V0_x$ through $V3_x$, vertical coordinates $V0_y$ through $V3_y$, and widths $V0_w$ through $V3_w$ which are associated with control points V0 through V3, respectively. It should be understood by those of ordinary skill in the art that control point V0 and control point V3 are known to be points along the centerline curve and that control points V1 and V2 determine the shape of the centerline curve between the control points V0 and V3.

Step S1010 can be performed in many ways. For example, assuming that the input device 20 includes a floppy disk drive, the horizontal and vertical coordinates and widths associated with each control point can be stored on a floppy disk and transmitted directly to the processor 30. Alternatively, if the input device 20 includes a keyboard, the operator can transmit the coordinates and widths into the processor 30 by typing them on the keyboard. Preferably, however, the input device includes a mouse (not shown) and, as shown in FIG. 5, the operator controls the mouse to move a pointer 110 along the display 70' to a position on the display 70' corresponding to the desired coordinates associated with a control point. To transmit the coordinates to the processor 30, the operator, for example, "clicks" the mouse, whereupon the control point is displayed on the display 70'. To enter the widths, the described embodiment provides a circle on the display 70', having a radius R, centered around each control point, as also shown in FIG. 5. The radius R corresponds to the width associated with the respective control point. To set the width associated with a control point, the operator uses the mouse to place the pointer 110 on the perimeter of a circle surrounding the control point. By "pulling" the perimeter of the circle either "in" or "out," the operator can vary the radius R of the circle and, thereby, vary the width associated with the respective control point. Preferably, the width of a control point is automatically transmitted to the processor 30 each time the radius R of the corresponding circle is changed. A type of software required to control the screen display of the display 70' is well known to persons of ordinary skill in the art. After completion of step S1010, control passes to step S1020.

In step S1020, the processor 30 generates initial forward differencing coefficients $\delta_{0x}$ through $\delta_{3x}$, $\delta_{0y}$ through $\delta_{3y}$, and $\delta_{0w}$ through $\delta_{3w}$ from each the coordinates and widths transmitted by the input device 20 in step S1010, as follows:

$$\delta_{0x} = V0_x \qquad \text{Eqn. 1.0}$$

$$\delta_{1x} = 3(V1_x - V0_x)dt + \qquad \text{Eqn. 1.1}$$

$$3(V0_x - 2V1_x + V2_x)dt^2 + [3(V1_x - V2_x) + V3_x - V0_x]dt^3$$

$$\delta_{2x} = 6(V0_x - 2V1_x + V2_x)dt^2 + \qquad \text{Eqn. 1.2}$$

$$6(3(V1_x - V2_x) + V3_x - V0_x)dt^3$$

$$\delta_{3x} = 6(3(V1_x - V2_x) + V3_x - V0_x)dt^3 \qquad \text{Eqn. 1.3}$$

$$\delta_{0y} = V0_y \qquad \text{Eqn. 2.0}$$

$$\delta_{1y} = 3(V1_y - V0_y)dt + \qquad \text{Eqn. 2.1}$$

$$3(V0_y - 2V1_y + V2_y)dt^2 + [3(V1_y - V2_y) + V3_y - V0_y]dt^3$$

$$\delta_{2y} = 6(V0_y - 2V1_y + V2_y)dt^2 + \qquad \text{Eqn. 2.2}$$

$$6(3(V1_y - V2_y) + V3_y - V0_y)dt^3$$

$$\delta_{3y} = 6(3(V1_y - V2_y) + V3_y - V0_y)dt^3 \qquad \text{Eqn. 2.3}$$

$$\delta_{0w} = V0_w \qquad \text{Eqn. 3.0}$$

$$\delta_{1w} = 3(V1_w - V0_w)dt + \qquad \text{Eqn. 3.1}$$

$$3(V0_w - 2V1_w + V2_w)dt^2 + [3(V1_y - V2_y) + V3_y - V0_y]dt^3$$

$$\delta_{2w} = 6(V0_w - 2V1_w + V2_w)dt^2 + \qquad \text{Eqn. 3.2}$$

$$6(3(V1_w - V2_w) + V3_w - V0_w)dt^3$$

$$\delta_{3w} = 6(3(V1_w - V2_w) + V3_w - V0_w)dt^3 \qquad \text{Eqn. 3.3}$$

Also in step S1020, the processor 30 generates initial forward differencing coefficients $\delta_{0dx/dt}$ through $\delta_{3dx/dt}$ and $\delta_{0dy/dt}$ through $\delta_{3dy/dt}$ from each the coordinates and widths transmitted by the input device 20 in step S1010, as follows:

$$\delta_{0dx/dt} = d_{0x} \qquad \text{Eqn. 4.0}$$

$$\delta_{1dx/dt} = 2(d_{1x} - d_{0x})dt + (d_{0x} - 2d_{1x} + d_{2x})dt^2 \qquad \text{Eqn. 4.1}$$

$$\delta_{2dx/dt} = 2(d_{0x} - 2d_{1x} + d_{2x})dt^2 \qquad \text{Eqn. 4.2}$$

$$\delta_{3dx/dt} = 0 \qquad \text{Eqn. 4.3}$$

$$\delta_{0dx/dt} = d_{0y} \qquad \text{Eqn. 5.0}$$

$$\delta_{1dx/dt} = 2(d_{1y} - d_{0y})dt + (d_{0y} - 2d_{1y} + d_{2y})dt^2 \qquad \text{Eqn. 5.1}$$

$$\delta_{2dx/dt} = 2(d_{0y} - 2d_{1y} + d_{2y})dt^2 \qquad \text{Eqn. 5.2}$$

$$\delta_{3dx/dt} = 0 \qquad \text{Eqn. 4.3}$$

where:

$$d_{0x} = V1_x - V0_x \qquad \text{Eqn. 6.0}$$

$$d_{1x} = V2_x - V1_x \qquad \text{Eqn. 6.1}$$

$$d_{2x} = V3_x - V2_x \qquad \text{Eqn. 6.2}$$

$$d_{0y} = V1_y - V0_y \qquad \text{Eqn. 6.3}$$

$$d_{1y} = V2_y - V1_y \qquad \text{Eqn. 6.4}$$

$$d_{2y} = V3_y - V2_y \qquad \text{Eqn. 6.5}$$

It should be understood that the term dt in the above equation represents an initial step size which is adjusted automatically. Good initial estimates are known to those of ordinary skill in the art.

In step S1030, the processor 30 initializes the FD unit 40 by loading, via the data/control bus 80, each of the initial forward differencing coefficients into a corresponding forwarding circuit of a corresponding one of the FD circuits 100, 110, 120, 130, and 140. For example, the processor 30 loads the initial coefficients $\delta_{0x}$ through $\delta_{3x}$ into the forwarding circuits $F_{0x}$ through $F_{3x}$, respectively, of the FD circuit 100; loads the initial coefficients $\delta_{0y}$ through $\delta_{3y}$ into the forwarding circuits $F_{0y}$ through $F_{3y}$, respectively, of the FD circuit 110; loads the initial coefficients $\delta_{0w}$ through $\delta_{3w}$ into the forwarding circuits $F_{0w}$ through $F_{3w}$, respectively, of the FD circuit 120; loads the initial coefficients $\delta_{dx/dt}$ through $\delta_{3dx/dt}$ into the forwarding circuits $F_{0dx/dt}$ through $F_{3dx/dt}$, respectively, of the FD circuit 130; and loads the initial coefficients $\delta_{0dy/dt}$ through $\delta_{3dy/dt}$ into the forwarding circuits $F_{0dy/dt}$ through $F_{3dy/dt}$, respectively, of the FD circuit 140.

The loading of the initial coefficients into the forwarding circuits by the processor 30 can be accomplished by appropriate control of the clock lines, data lines, and latch control lines of each forwarding circuit. Specifically, the processor 30 places the initial coefficients on the corresponding data lines of the forwarding circuits, places a high signal on each of the latch control lines, and sends a clock pulse to each of the clock lines. Also in step S1030, the processor 30 stores the initial coefficients into corresponding registers of the adjustment unit 50 via data/control bus 100. After completion of step S1020, control passes to step S1040.

In step S1040, the processor 30 generates right and left offset points corresponding to each of the control points V0 and V3. As described above, both V0 and V3 are known to be points along the centerline curve and, accordingly, the corresponding right and left offset points can be generated by the processor 30 using the coordinates and widths associated with the control points V0 and V3 and their respective tangent vectors.

For example, the processor 30 generates a right offset point $V0_{ro}=(V0_{rox}, V0_{roy})$ and left offset point $V0_{lo}=(V0_{lox}, V0_{loy})$ corresponding to the control point V0, and generates a right offset point $V3_{ro}=(V3_{rox}, V3_{roy})$ and left offset point $V3_{lo}=(V3_{lox}, V3_{loy})$ corresponding to the control point V3, as follows:

$$V0_{rox} = V0_x + (V0_{nx})(V0_w) \qquad \text{Eqn. 7.0}$$
$$V0_{roy} = V0_y + (V0_{ny})(V0_w) \qquad \text{Eqn. 7.1}$$
$$V0_{lox} = V0_x - (V0_{nx})(V0_w) \qquad \text{Eqn. 7.2}$$
$$V0_{loy} = V0_y - (V0_{ny})(V0_w) \qquad \text{Eqn. 7.3}$$
$$V3_{rox} = V3_x + (V3_{nx})(V3_w) \qquad \text{Eqn. 7.4}$$
$$V3_{roy} = V3_y + (V3_{ny})(V3_w) \qquad \text{Eqn. 7.5}$$
$$V3_{lox} = V3_x - (V3_{nx})(V3_w) \qquad \text{Eqn. 7.6}$$
$$V3_{loy} = V3_y - (V3_{ny})(V3_w) \qquad \text{Eqn. 7.7}$$

where:

$$V0_n = [V0_{nx}, V0_{ny}] = \frac{(-V0_{dx/dt}, V0_{dy/dt})}{[(V0_{dx/dt})^2 + (V0_{dy/dt})^2]^{\frac{1}{2}}} \qquad \text{Eqn. 8.0}$$

$$V3_n = [V3_{nx}, V3_{ny}] = \frac{(-V3_{dx/dt}, V3_{dy/dt})}{[(V3_{dx/dt})^2 + (V3_{dy/dt})^2]^{\frac{1}{2}}} \qquad \text{Eqn. 8.1}$$

It should be evident from the foregoing that each right and left offset point generated by the processor 30 is associated with a horizontal coordinate and a vertical coordinate.

Once the processor 30 has generated the right and left offset points corresponding to each of the control points V0 and V3, the processor 30 transmits, via the data/control bus 80, the horizontal and vertical coordinates to the offset generator 60. Upon completion of step S1040, control passes to step S1050.

In step S1050, the offset generator 60 converts the horizontal and vertical coordinates associated with the offset points corresponding to the control points V0 and V3 into horizontal and vertical screen coordinates, respectively. Preferably, the horizontal and vertical screen coordinates correspond to horizontal and vertical positions, respectively, of pixels on the display 70. To perform the conversion process, the offset generator 60, preferably, selects the high order bits of the internal representations for converting the horizontal coordinates into horizontal screen coordinates and for converting the vertical coordinates into vertical screen coordinates. Upon completion of step S1050, control passes to step S1060.

In step S1060, the offset generator 60 designates the right and left offset points corresponding to the control point V0 as "current" right and left offset points, respectively. Also in step S1060, the offset generator 60 designates the right and left offset points corresponding to the control point V3 as "end" right and left offset points, respectively. Control then passes to step S1070.

In step S1070, the offset generator 60 transmits the horizontal and vertical screen coordinates associated with the "current" offset points to the display 70, wherein the display 70 displays graphical representations of the "current" offset points to display a portion of, i.e., two points along, the outer boundary of the freeform curve. Upon completion of step S1070, control passes to step S1080.

In step S1080, the offset generator 60 determines whether the screen coordinates associated with the "current" offset points are the same as the screen coordinates associated with the "end" offset points. If the offset generator 60 determines that the screen coordinates associated with the "current" offset points are the same as the screen coordinates associated with the "end" offset points, operation of the system 10 is stopped. Otherwise, control passes to step S1090.

In step S1090, the offset generator 60 determines whether to instruct the adjustment unit 50 to update the forward differencing coefficients stored in the latches of the FD unit 40. Specifically, if the x and y coordinates of both of the new offset points are in the same pixel as the corresponding current offset points, it instructs the adjustment unit 50 to double the step size, in which case the adjustment unit 50 uses the values of the coefficients before the step was taken to compute new coefficients corresponding to a step size twice as large, and loads them into the latches of the FD unit 40. If, however, the x or y coordinate of either new offset point is more than one pixel away from the corresponding coordinate of the corresponding current offset point, the offset generator 60 instructs the adjustment unit 50 to halve the step size, in which case the adjustment unit 50 uses the values of the coefficients before the step was taken to compute new coefficients corresponding to a step size half as large and loads them into the latches of the FD unit 40. Upon completion of step S1090, control passes to step S1100, In step S1100, the processor 30 controls the FD unit 40, via the data/control bus 80, to perform one "step" of a forward differencing technique on the updated coefficients that were loaded into its forwarding circuits by the adjustment unit 50 in step S1090. In particular, the processor 30 places a low signal on the latch control lines of each forwarding circuit in the FD unit 40 and sends one clock pulse along each clock line. As explained above, this action by the processor 30 causes the coefficient loaded in each forwarding circuit to be added to the coefficient loaded in a subsequent forwarding circuit, the result being that each FD circuit of the FD unit 40 produces a new output value. It should be understood that these new output values describe a "new" point p along the centerline curve of the freeform stroke.

For example, upon completion of step S1100, the FD circuit 110 produces a "new" horizontal coordinate $P_x$, the FD circuit 120 produces a "new" vertical coordinate $p_y$, and the FD circuit 130 produces a "new" width $P_w$, each of which is associated with the "new" point p. In addition, the FD circuit 130 produces a "new" value $P_{dx/dt}$ and the FD circuit 140 produces a "new" value $P_{dy/dt}$ which, as will be described below, are used to generate a unit normal vector associated with the "new" point p. After generating the "new" values $P_x$, $P_y$, $P_w$, $P_{dx/dt}$, and $P_{dy/dt}$, the FD unit 40 transmits the "new" values to the offset generator 60. Upon completion of step S1100, control passes to step S1110.

In step S1110, the offset generator 60 generates a unit normal vector $P_n$ associated with the "new" point p, as follows:

$$p_n = (p_{nx}, p_{ny}) \qquad \text{Eqn. 9.0}$$
$$= \frac{(-p_{dx/dt}, p_{dy/dt})}{[(p_{dx/dt})^2 + (p_{dy/dt})^2]^{\frac{1}{2}}}$$

The circuitry required by the offset generator 60 to generate the unit normal vector $P_n$ can comprise, for example, adders, multipliers, storage registers, and appropriate control logic. Upon completion of step S1110, control then passes to step S1120.

In step S1120, the offset generator 60 generates "new" right and left offset points corresponding to the "new" point p. Specifically, the offset generator 60 generates the "new" offset points such that each is associated with a horizontal coordinate and a vertical coordinate generated in accordance with the horizontal coordinate, vertical coordinate, width, and normal vector associated with the "new" point p.

For example, the processor 30 generates a "new" right offset point $p_{ro}=(P_{rox}, P_{roy})$ and "new" left offset point $P_{lo}=(P_{lox}, P_{loy})$, as follows:

$$p_{rox} = p_x + (p_{nx})(p_w) \qquad \text{Eqn. 10.0}$$
$$p_{roy} = p_y + (p_{ny})(p_w) \qquad \text{Eqn. 10.1}$$
$$p_{lox} = p_x - (p_{nx})(p_w) \qquad \text{Eqn. 10.2}$$
$$p_{loy} = p_y - (p_{ny})(p_w) \qquad \text{Eqn. 10.3}$$

Once again, the circuitry required by the offset generator 60 to generate the "new" offset points can comprise, for example, adders, multipliers, storage registers, and appropriate control logic. Upon completion of step S1120, control passes to step S1130.

In step S1130, the offset generator 60 converts the horizontal and vertical coordinates associated with each of the "new" offset points into horizontal and vertical screen coordinates, respectively. As mentioned above with regard to step S1050, the horizontal and vertical screen coordinates correspond to horizontal and vertical positions, respectively, of pixels on the display 70.

As also mentioned above with regard to step S1050, the offset generator 60, preferably, selects the high order bits of the internal representations for performing the conversion process. Upon completion of step S1130, control passes to step S1140.

In step S1140, the offset generator 60 compares the horizontal and vertical screen coordinate associated with the "new" right offset point with the horizontal and vertical screen coordinates, respectively, associated with the "current" right offset point to determine a right offset horizontal distance and a right offset vertical distance, respectively.

Also in step S1140, the offset generator 60 compares the horizontal and vertical screen coordinate associated with the "new" left offset point with the horizontal and vertical screen coordinates, respectively, associated with the "current" left offset point to determine a left offset horizontal distance and a left offset vertical distance, respectively.

It should be understood that the left and right offset horizontal and vertical distances indicate how far apart on the display 70 graphical representations of the "new" and "current" right and left offset points would be displayed. Upon completion of step S1140, control passes to step S1150.

In step S1150, the offset generator 60 determines whether each of the right and left offset horizontal distances and each of the right and left offset vertical distances is within a predetermined range of values. The purpose of this step is to determine whether the differences between the screen coordinates associated with the "current" and "new" offset points correspond to the distances between adjacent pixels of the display 70. Preferably, the "current" and "new" offset points are one pixel distance apart and, therefore, the predetermined range of values, preferably, corresponds to one pixel distance of the display 70.

If in step S1150 the offset generator 60 determines that any of the right and left offset horizontal distances and the right and left offset vertical distances are not within the predetermined range of values, control passes to step S1160. Otherwise, control passes to step S1170.

In step S1160, the offset generator 60 instructs the adjustment unit 50 to update the forward differencing coefficients that are stored in its registers in accordance with a new step size, and to load the updated coefficients into the FD unit 40. Preferably, the offset generator 60 instructs the adjustment unit 50 to update the coefficients in accordance with a doubled step size when any of the right and left offset horizontal distances and right and left offset vertical distances is less than the predetermined range of values. Likewise, preferably, the offset generator 60 instructs the adjustment unit 50 to update the coefficients in accordance with a halved step size when any of the right and left offset horizontal distances and right and left offset vertical distances is greater than the predetermined range of values. Upon completion of step S1160 control returns to step S1100. Preferably, however, if the step size has been halved since the last step was taken, it is not doubled until another step is taken.

In step S1170, the offset generator 60 designates the "new" offset points as the "current" offset points. Upon completion of step S1170, control returns to step S1070.

Second Embodiment

Figure 6:
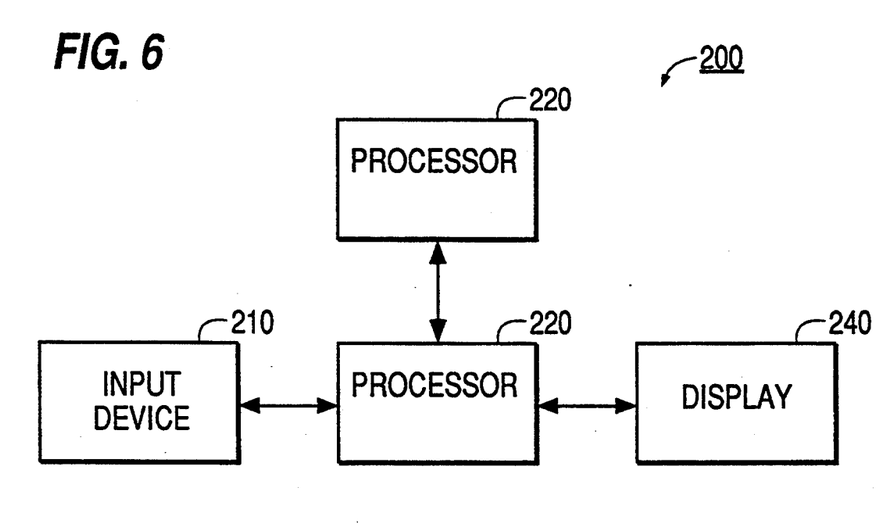
FIG. 6 is a block diagram of a data processing system for generating and displaying freeform strokes in accordance with another embodiment of the present invention.

As shown in FIG. 6, there is provided a data processing system 200 for generating and displaying a freeform stroke of constant or varying width in accordance with a second embodiment of the present invention. The data processing system 200 comprises an input device 210, a processor 220, a memory 230, and a display 240.

The input device 210 and display 240 of FIG. 6 comprise the same or equivalent components and perform the same or equivalent functions as the input device 20 and display 70, respectively, of FIG. 1.

The processor 220 comprises, for example, any standard CPU capable of performing the same or equivalent functions performed by the processor 30, FD unit 40, adjustment unit 50, and offset generator 60 of FIG. 1. As in the first embodiment, the processor 220 can comprise a Motorola 680x0, Intel/IBM R6000, or SPARC.

The memory 230 comprises, for example, any of a magnetic, optical, and semiconductor memory for storing a software program which is executed by the processor 220 to enable it to perform the same or equivalent functions performed by the processor 30, FD unit 40, adjustment unit 50, and offset generator 60 of FIG. 1.

An example of such a software program can be found in Appendix A. Appendix A is incorporated in and constitutes a part of the specification. The program in Appendix A is written in the language "C" and is intended to be executed by a data processing system based upon the Motorola 680x0, Intel/IBM R6000, or SPARC processor. The memory 230 also serves as a workspace for the processor 220 in a manner known to those of ordinary skill in the art.

It should be understood that operation of the data processing, system 200 of FIG. 6 is the same or equivalent to the operation of the freeform stroke generation and display system 10 of FIG. 1 and, therefore, a detailed description of such will be omitted.

Additional advantages and modifications of the present invention will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

Appendix A

Page 1, line 1

```
#include <math.h>
#define TRACING
#define DEBUG
#include "debug.h"
#include "2Dcurves.h"

Screen_Coord to_screen( c )
Point c;
{
    Screen_Coord s;
    s.x = (int)c.x;
    s.y = (int)c.y;
    return s;
}

AFD_Left( s )
dAFD s;
{
    int i = 0;
    Screen_Coord current_left;
    Screen_Coord leftend;
    /*
    Set_Colour( red = 0xff - red, green = 0xff - green, 0 );
    */
    current_left = s->loff = to_screen( s->lp0 );
    leftend = to_screen( s->leftend );
    Draw_Pnt( s->loff );
    /*
    ...
    */
    while( Delta( leftend, current_left ) >1 )
    {
        while( s->dl.x > 1.5 || s->dl.y > 1.5 || s->dl.x < -1 || s->loff ) < 1 )
            Halve( s );
        Step( s );
        while( Delta( current_left, s->loff ) < 1 )
        {
            BackStep( s );
            Double( s );
            Step( s );
        }
        while( Delta( current_left, s->loff ) > 1 )
        {
            BackStep( s );
            Binary_Search( s );
            Draw_Pnt( s->loff );
        }
        if( Delta( current_left, s->loff ) == 1 )
        {
            current_left = s->loff;
            Draw_Pnt( s->loff );
        }
        if( 10 == i++ )
        {
            Screen_Coord p;
            p.x = (int)s->p.x;
            p.y = (int)s->p.y;
            Draw_Pnt( p );
            i = 0;
        }
    }
    Draw_Pnt( leftend );
}

AFD_Right( s )
dAFD s;
{
    int i = 0;
    Screen_Coord current_right;
    Screen_Coord rightend;
    /*
    Set_Colour( red = 0xff - red, green = 0xff - green, 0 );
    */
    current_right = s->roff = to_screen( s->rp0 );
    rightend = to_screen( s->roff );
    Draw_Pnt( s->roff );
    /*
    ...
    */
    while( Delta( rightend, current_right ) >1 )
    {
        while( s->dt.x > 1.5 || s->dl.y > 1.5 || s->dt.x < -1.5 || s->dl.y < -1
            Halve( s );
        Step( s );
        while( Delta( current_right, s->roff ) < 1 )
        {
            BackStep( s );
            Double( s );
            Step( s );
        }
        while( Delta( current_right, s->roff ) > 1 )
        {
            /* one side or the other is moving too fast */
            BackStep( s );
            Halve( s );
            Step( s );
        }
        if( Delta( current_right, s->roff ) < 1 )
        {
            Binary_Search( s );
            Draw_Pnt( s->roff );
        }
        if( Delta( current_right, s->roff ) == 1 )
        {
            current_right = s->roff;
            MSG( "skipped a pixel" );
            Draw_Pnt( s->roff );
            current_right = s->roff;
        }
        if( 10 == i++ )
        {
            Screen_Coord p;
            p.x = (int)s->p.x;
            p.y = (int)s->p.y;
            Draw_Pnt( p );
            i = 0;
        }
    }
    Draw_Pnt( rightend );
}

AFD_Draw( s )
dAFD s;
{
    int i = 0;
    Screen_Coord current_left, current_right;
    Screen_Coord leftend, rightend;
    if( s->leftonly ){
        AFD_Left( s );
        return;
    }
    if( s->rightonly ){
        AFD_Right( s );
        return;
    }
    /*
    Set_Colour( red = 0xff - red, green = 0xff - green, 0 );
    */
    current_left = s->loff = to_screen( s->lp0 );
    current_right = s->roff = to_screen( s->rp0 );
    leftend = to_screen( s->leftend );
    rightend = to_screen( s->rightend );
    Draw_Pnt( s->roff );
    Draw_Pnt( s->loff );
```

Page 2, line 124

```c
/* ... */
if( s->curvature * s->p.w > 0.0 )
  /* use left */
  while( Delta( leftend, current_left ) >1
      || Delta( rightend, current_right ) >1 )
      while( s->dl.x > 1.5 || s->dl.y > 1.5 || s->dl.x < -1.5 || s->dl.y < -1.5 )
          Halve( s );
      Step( s );
      while( Delta( current_left, s->loff ) <1
         && Delta( current_right, s->roff ) <1 )
         BackStep( s );
         Double( s );
         Step( s );
      while( Delta( current_left, s->loff ) >1
         || Delta( current_right, s->roff ) >1 )
         /* one side or the other is moving too fast */
         BackStep( s );
         Halve( s );
         Step( s );
      if( Delta( current_left, s->loff ) <1
        && Delta( current_right, s->roff ) <1 )
          Binary_Search( s );
      if( Delta( current_left, s->loff ) == 1 )
          current_left = s->loff;
          Draw_Pnt( s->loff );
      if( Delta( current_right, s->roff ) == 1 )
          current_right = s->roff;
          Draw_Pnt( s->roff );
      if( 10 == i++ )
          Screen_Coord p;
          p.x = (int)s->p.x;
          p.y = (int)s->p.y;
          Draw_Pnt( p );
          i = 0;
      ;
  Draw_Pnt( s->roff );
  Draw_Pnt( s->loff );
else /* use right */
  while( Delta( leftend, current_left ) >1
      || Delta( rightend, current_right ) >1 )
      while( s->dl.x > 1.5 || s->dl.y > 1.5 || s->dl.x < -1.5 || s->dl.y < -1.5 )
          Halve( s );
      Step( s );
      while( Delta( current_left, s->loff ) <1
         && Delta( current_right, s->roff ) >1 )
         BackStep( s );
         Double( s );   /* change step size */
         Step( s );     /* move probe forward */
      while( Delta( current_right, s->roff ) >1   /* both sides */
         || Delta( current_left, s->loff ) >1 )
         BackStep( s ); /* retract probe - preserve stepsize */
         Halve( s );    /* drop step size */
         Step( s );     /* take smaller step */
      if( Delta( current_right, s->loff ) <1
        && Delta( current_left, s->roff ) <1 )
          Binary_Search( s );
      if( Delta( current_right, s->roff ) == 1 )
          current_right = s->roff;
          Draw_Pnt( s->roff );
      if( Delta( current_left, s->loff ) == 1 )
          current_left = s->loff;
          Draw_Pnt( s->loff );
      if( Delta( current_right, s->roff ) > 1 )
          MSG( "skipped a left pixel" );
          Draw_Pnt( s->loff );
          current_left = s->loff;
      if( Delta( current_right, s->roff ) > 1 )
          MSG( "skipped a right pixel" );
          Draw_Pnt( s->roff );
          current_right = s->roff;
      if( i++ == 10 )
          Screen_Coord p;
          p.x = (int)s->p.x;
          p.y = (int)s->p.y;
          Draw_Pnt( p );
          i = 0;
      ;
  Draw_Pnt( leftend );
  Draw_Pnt( rightend );
;

int Delta( a, b )
Screen_Coord a, b;
    int rx = a.x - b.x;
    int ry = a.y - b.y;
    if( rx > 0 )
        if( ry < rx ) return ry;
        if( ry < 0 && -ry > rx ) return -ry;
        return rx;
    if( ry < rx ) return -ry;
    if( ry > 0 && ry > -rx ) return ry;
    return -rx;

double InvRoot( estimate, x ) /* one step of Newton's method - no check */
double estimate, x;
    double v1 = 1.0 / ( estimate * estimate ) - x;
    double v2 = -0.5  * ( estimate * estimate * estimate );
    if( v1 * v1 < 1e-6 )
        return estimate - v1*v2;
    else
        return 1.0 / sqrt( x );

static dAFD_rec savepos;
/*
Screen_Coord CheapStep( d )
dAFD d;
    ControlPoint p;
    p.x = d->p.x + d->dl.x;
    p.y = d->p.y + d->dl.y;
    return to_screen( p );
*/ static int stepcount;
Step( d )
dAFD d;
```

Page 3, line 248

```
/*
 * ...
 */
    double lengthsq;
    double normalization;
    Point PV_addc(), PV_subtractc();
    savepos = *d;
    d->t += d->dt;
    d->p.x += d->d1.x;
    d->d1.x += d->d2.x;
    d->d2.x += d->d3.x;
    d->p.y += d->d1.y;
    d->d1.y += d->d2.y;
    d->d2.y += d->d3.y;
    d->p.w += d->d1.w;
    d->d1.w += d->d2.w;
    d->d2.w += d->d3.w;
    /*
    d->o.x = d->d1.y;      /* Now we have the direction */
    d->o.y = -d->d1.x;
    lengthsq = d->o.x * d->o.x + d->o.y * d->o.y;
    */
    if( true == d->valid ) {
        d->normalization = 1.0 / sqrt( lengthsq );
        d->valid = true;
    } else
        d->normalization = d->normalization * d->p.w;
    d->o.x *= normalization;
    d->o.y *= normalization;
    d->lp0 = PV_addc( d->p, d->o );
    d->rp0 = PV_subtractc( d->p, d->o );
    d->loff = to_screen( d->lp0 );
    d->roff = to_screen( d->rp0 );

BackStep( d )
dAFD d;
    d->d2.w -= d->d3.w;
    d->d1.w -= d->d2.w;
    d->p.w -= d->d1.w;
    d->d2.y -= d->d3.y;
    d->d1.y -= d->d2.y;
    d->p.y -= d->d1.y;
    d->d2.x -= d->d3.x;
    d->d1.x -= d->d2.x;
    d->p.x -= d->d1.x;
    d->t -= d->dt;
    d->valid = false;

Halve( d )
dAFD d;
    d->dt *= 0.5;
    d->d1.x = d->d1.x * 0.5 - d->d2.x * 0.125 + d->d3.x * 0.0625;
    d->d2.x = d->d2.x * 0.25 - d->d3.x * 0.125;
    d->d3.x *= 0.125;
    d->d1.y = d->d1.y * 0.5 - d->d2.y * 0.125 + d->d3.y * 0.0625;
    d->d2.y = d->d2.y * 0.25 - d->d3.y * 0.125;
    d->d3.y *= 0.125;
    d->d1.w = d->d1.w * 0.5 - d->d2.w * 0.125 + d->d3.w * 0.0625;
    d->d2.w = d->d2.w * 0.25 - d->d3.w * 0.125;
    d->d3.w *= 0.125;
    d->valid = false;

Double( d )
dAFD d;
    d->dt += d->dt;
    d->d1.x = 2.0 * d->d1.x + d->d2.x + d->d3.x;
    d->d2.x = 4.0 * ( d->d2.x + d->d3.x );
    d->d3.x *= 8.0;
    d->d1.y = 2.0 * d->d1.y + d->d2.y + d->d3.y;
    d->d2.y = 4.0 * ( d->d2.y + d->d3.y );
    d->d3.y *= 8.0;
    d->d1.w = 2.0 * d->d1.w + d->d2.w + d->d3.w;
    d->d2.w = 4.0 * ( d->d2.w + d->d3.w );
    d->d3.w *= 8.0;
    d->valid = false;

Binary_Search( d )
dAFD d;
    double m; /* ratio of old dt to new. */
    dAFD_rec dtemp;
    int delta, deltar, deltal;
    Screen_Coord loff;
    Screen_Coord roff;
    /*
     * ...
     */
    roff = d->roff;
    loff = d->loff;
    dtemp = *d;
    Double( &dtemp );
    deltar = Delta( dtemp.roff, roff );
    deltal = Delta( dtemp.loff, loff );
    delta = deltar > deltal?deltar:deltal;
    while( 1 != delta ) {
        if( delta > 1 ) { /* too far - undo last step */
            BackStep( & dtemp );
            Halve( & dtemp );
            Step( & dtemp );
            deltar = Delta( dtemp.roff, roff );
            deltal = Delta( dtemp.loff, loff );
            delta = deltar > deltal?deltar:deltal;
```

Page 4, line 372

```
           */
     d->d1.x = dtemp.p.x - d->p.x;
     d->d1.y = dtemp.p.y - d->p.y;
     d->d1.w = dtemp.p.w - d->p.w;
     m = 1.0/d->dt;
     d->dt = dtemp.t - d->t;
     m *= d->dt;
     d->d2.x = m * m * ( d->d2.x + d->d2.x + m - 1.0 * d->d3.x );
     d->d2.y = m * m * ( d->d2.y + d->d2.y + m - 1.0 * d->d3.y );
     d->d2.w = m * m * ( d->d2.w + d->d2.w + m - 1.0 * d->d3.w );
     d->d3.x = d->d3.x * m * m * m;
     d->d3.y = d->d3.y * m * m * m;
     d->d3.w = d->d3.w * m * m * m;
     Step( d );
     return;
     /* end binary search */
```

Page 1, line 1

```
#include "2Dcurves.h"
include <math.h> double Dot( v1, v2 )
Vector v1, v2;
{
    return ( v1.x * v2.x + v1.y * v2.y );
}

Vector V_fromc( p1, p2 )
ControlPoint p1, p2;
{
    Vector v;
    v.x = p2.x - p1.x;
    v.y = p2.y - p1.y;
    return v;
}

Vector V_add( v1, v2 )
Vector v1, v2;
{
    Vector r;
    r.x = v1.x + v2.x;
    r.y = v1.y + v2.y;
}

Vector V_subtract( v1, v2 )
Vector v1, v2;
{
    Vector r;
    r.x = v1.x - v2.x;
    r.y = v1.y - v2.y;
}

Point PV_addc( p, v )
ControlPoint p;
Vector v;
{
    Point r;
    r.x = p.x + v.x;
    r.y = p.y + v.y;
    return r;
}

Point PV_subtractc( p, v )
ControlPoint p;
Vector v;
{
    Point r;
    r.x = p.x - v.x;
    r.y = p.y - v.y;
    return r;
}

Vector V_scale( v, s )
Vector v;
double s;
{
    v.x *= s;
    v.y *= s;
    return v;
} double V_length( v )
Vector v;
{
    return sqrt( v.x * v.x + v.y * v.y );
}
```

What is claimed is:

What is claimed is:

1. A method of generating and displaying a freeform stroke, comprising the steps of:

generating, using an adaptive forward differencing technique in accordance with a step size of a parameter t, points along a centerline curve of the freeform stroke, said centerline curve being a spline curve varying as a function of said parameter t, and each of said points along said centerline curve being associated with a horizontal coordinate defined by a function x(t), a vertical coordinate defined by a function y(t), and a width defined by a function w(t);

generating a normal vector associated with each of said points along said centerline curve;

generating points along a right offset curve and a left offset curve for corresponding ones of said points along said centerline curve, said right and left offset curves defining an outer boundary of said freeform stroke and each of said points along said right and left offset curves being associated with a horizontal coordinate and a vertical coordinate generated in accordance with the horizontal coordinate, vertical coordinate, width, and normal vector associated with a corresponding point along said centerline curve; and displaying graphical representations of said points along said right and left offset curves to display the outer boundary of the freeform stroke.

2. The method of claim 1, wherein the step of generating said points along said right offset curve and said left offset curve includes the steps, performed each time a point along said right and left offset curve is generated, of:

comparing a horizontal coordinate and vertical coordinate associated with a currently generated one of said points along said right offset curve with a horizontal coordinate and vertical coordinate, respectively, associated with a previously generated one of said points along said right offset curve to determine a right offset horizontal distance and right offset vertical distance, respectively, between said currently generated one of said points along said right offset curve and said previously generated one of said points along said right offset curve;

comparing a horizontal coordinate and vertical coordinate associated with a currently generated one of said points along said left offset curve with a horizontal coordinate and vertical coordinate, respectively, associated with a previously generated one of said points along said left offset curve to determine a left offset horizontal distance and a left offset vertical distance, respectively, between said currently generated one of said points along said left offset curve and said previously generated one of said points along said left offset curve; and determining whether each of said right and left offset horizontal distances and each of said right and left offset vertical distances are within a predetermined range of values.

3. The method of claim 2, further including the step of varying said step size of said parameter t when any of said right and left offset horizontal distances and said right and left offset vertical distances are not within said predetermined range of values.

4. The method of claim 3, wherein the step of varying said step size of said parameter t includes the steps of:

increasing said step size of said parameter t when any of said right and left offset horizontal distances and said right and left offset vertical distances is less than said predetermined range of values; and decreasing said step size of said parameter t when any of said right and left offset horizontal distances and said right and left offset vertical distances is greater than said predetermined range of values.

5. The method of claim 2, wherein the step of displaying said graphical representations of said points along said right and left offset curves includes the step of displaying graphical representations of said points along said right and left offset curves only when each of said right and left offset horizontal distances and said right and left offset vertical distances is within said predetermined range of values.

6. The method of claim 1, wherein the step of generating said points along said centerline curve includes the steps, performed before the step of generating points along said centerline curve, of:

specifying horizontal coordinate coefficients, vertical coordinate coefficients, and width coefficients describing said functions x(t), y(t), and w(t), respectively; and specifying an initial step size of said parameter t.

7. An apparatus for generating and displaying a freeform stroke, comprising:

means for generating, using an adaptive forward differencing technique in accordance with a step size of a parameter t, points along a centerline curve of the freeform stroke, said centerline curve being a spline curve varying as a function of said parameter t, and each of said points along said centerline curve being associated with a horizontal coordinate defined by a function x(t), a vertical coordinate defined by a function y(t), and a width defined by a function w(t);

means for generating a normal vector associated with each of said points along said centerline curve;

means for generating points along a right offset curve and a left offset curve for corresponding ones of said points along said centerline curve, said right and left offset curves defining an outer boundary of said freeform stroke and each of said points along said right and left offset curves being associated with a horizontal coordinate and a vertical coordinate generated in accordance with the horizontal coordinate, vertical coordinate, width, and normal vector associated with a corresponding point along said centerline curve; and means for displaying graphical representations of said points along said right and left offset curves to display the outer boundary of the freeform stroke.

8. The apparatus of claim 7, wherein said means for generating said points along said right offset curve and said left offset curve includes:

means for, each time a point along said right and left offset curve is generated, comparing a horizontal coordinate and vertical coordinate associated with a currently generated one of said points along said right offset curve with a horizontal coordinate and vertical coordinate, respectively, associated with a previously generated one of said points along said right offset curve to determine a right offset horizontal distance and right offset vertical distance, respectively, between said currently generated one of said points along said right offset curve and said previously generated one of said points along said right offset curve, comparing a horizontal coordinate and vertical coordinate associated with a currently generated one of said points along said left offset curve with a horizontal coordinate and vertical coordinate, respectively, associated with a previously generated one of said points along said left offset curve to determine a left offset horizontal distance and a left offset vertical distance, respectively, between said currently generated one of said points along said left offset curve and said previously generated one of said points along said left offset curve, and determining whether each of said right and left offset horizontal distances and each of said right and left offset vertical distances are within a predetermined range of values.

9. The apparatus of claim 8, further including means for varying said step size of said parameter t when any of said right and left offset horizontal distances and said right and left offset vertical distances are not within said predetermined range of values.

10. The apparatus of claim 9, wherein said means for varying said step size of said parameter t includes:

means for increasing said step size of said parameter t when any of said right and left offset horizontal distances and said right and left offset vertical distances is less than said predetermined range of values; and means for decreasing said step size of said parameter t when any of said right and left offset horizontal distances and said right and left offset vertical distances is greater than said predetermined range of values.

11. The apparatus of claim 8, wherein said means for displaying said graphical representations of said points along said right and left offset curves displays said graphical representations only when each of said right and left offset horizontal distances and said right and left offset vertical distances is within said predetermined range of values.

12. The apparatus of claim 7, wherein said means for generating said points along said centerline curve includes:

means for, before the generation of said points along said centerline curve, specifying horizontal coordinate coefficients, vertical coordinate coefficients, and width coefficients describing said functions x(t), y(t), and w(t), respectively; and means for, before the generation of said points along said centerline curve specifying an initial step size of said parameter t.

* * * * *